(12) United States Patent
Faisman et al.

(10) Patent No.: US 7,881,930 B2
(45) Date of Patent: Feb. 1, 2011

(54) ASR-AIDED TRANSCRIPTION WITH SEGMENTED FEEDBACK TRAINING

(75) Inventors: Alexander Faisman, Croton-on-Hudson, NY (US); Alexander Sorin, Haifa (IL)

(73) Assignee: Nuance Communications, Inc., Burlington, MA (US)

( * ) Notice: Subject to any disclaimer, the term of this patent is extended or adjusted under 35 U.S.C. 154(b) by 888 days.

(21) Appl. No.: 11/767,537

(22) Filed: Jun. 25, 2007

(65) Prior Publication Data

US 2008/0319743 A1    Dec. 25, 2008

(51) Int. Cl.
*G10L 15/26* (2006.01)
(52) U.S. Cl. ........................... 704/235; 704/243
(58) Field of Classification Search ............ 704/235, 704/243
See application file for complete search history.

(56) References Cited

U.S. PATENT DOCUMENTS

| | | | |
|---|---|---|---|
| 6,263,308 B1 * | 7/2001 | Heckerman et al. | 704/231 |
| 2005/0149337 A1 | 7/2005 | Asadi et al. | |
| 2006/0041427 A1 * | 2/2006 | Yegnanarayanan et al. | 704/235 |
| 2006/0149558 A1 | 7/2006 | Kahn et al. | |
| 2007/0118374 A1 * | 5/2007 | Wise et al. | 704/235 |

OTHER PUBLICATIONS

Kawahara, T.; Nanjo, H.; Furui, S., "Automatic transcription of spontaneous lecture speech", 2001 IEEE Workshop on Automatic Speech Recognition and Understanding. ASRU 2001. Conference Proceedings (Cat. No. 01EX544), 2001, 186-9.
Sara Basson et al, "Accessibility, Speech Technology, and Human Interventions", AVIOS 2005 http://www.crim.ca/files/documents/services/rd/parole/RAP/RAP_Eng.htm.

* cited by examiner

*Primary Examiner*—Abul Azad
(74) *Attorney, Agent, or Firm*—Wolf, Greenfield & Sacks, P.C.

(57) ABSTRACT

An ASR-aided transcription system with segmented feedback training is provided, the system including a transcription process manager configured to extract a first segment and a second segment from an audio input of speech uttered by a speaker, and an ASR engine configured to operate in a first speech recognition mode to convert the first speech segment into a first text transcript using a speaker-independent acoustic model and a speaker-independent language model, operate in a first training mode to create a speaker-specific acoustic model and a speaker-specific language model by adapting the speaker-independent acoustic model and the speaker-independent language model using either of the first segment and a corrected version of the first text transcript, and operate in a second speech recognition mode to convert the second speech segment into a second text transcript using the speaker-specific acoustic model and the speaker-specific language model.

18 Claims, 5 Drawing Sheets

US 7,881,930 B2

ASR-AIDED TRANSCRIPTION WITH SEGMENTED FEEDBACK TRAINING

FIELD OF THE INVENTION

The present invention relates to Automatic Speech Recognition (ASR) systems in general, and in particular to systems and methods for ASR-aided transcription.

BACKGROUND OF THE INVENTION

Computer-implemented Automatic Speech Recognition (ASR) systems typically employ both an acoustic model and a language model of speech to convert audio representations of human speech into text. A commercial ASR system is typically initially configured with a speaker-independent acoustic model and a general language model. The ASR system may be "trained" with the speech of a particular speaker to achieve increased accuracy when processing speech from that speaker. Such training adapts the acoustic model and language model by tailoring them to the speaker's voice and lexicon respectively. Accordingly, the training process is often referred to as acoustic and language model training. Acoustic model training is typically performed using a training dataset of speech samples provided by the speaker who utters a prepared text provided by the ASR system manufacturer. Language model training process typically requires text input only. The text input preferably embodies the speaker's linguistic habits and the lexical domain of interest. Such representative text input is used to enrich the recognition vocabulary and refine word statistics stored in the general language model.

Companies that provide commercial transcription services may use ASR systems to initially process speech and produce a rough transcript together with time offsets of the transcribed words found in the speech audio. A human proofreader then typically compares the rough transcript to the audio and corrects it. The time offsets can be used for synchronization between the audio playback and the transcript display. By their nature, such services typically must rely on speaker-independent acoustic models and general language models, as the speakers are generally not "known" to the ASR systems or available to train them. As such, they are not as accurate as ASR systems that employ trained, speaker-dependent models, thus increasing the burden on the human proofreaders.

SUMMARY OF THE INVENTION

The present invention in embodiments thereof discloses systems and methods for ASR-aided transcription.

In one aspect of the present invention an ASR-aided transcription system with segmented feedback training is provided, the system including a transcription process manager configured to extract a first segment and a second segment from an audio input of speech uttered by a speaker, and an ASR engine configured to operate in a first speech recognition mode to convert the first speech segment into a first text transcript using a speaker-independent acoustic model and a speaker-independent language model, operate in a first training mode to create a speaker-specific acoustic model and a speaker-specific language model by adapting the speaker-independent acoustic model and the speaker-independent language model using either of the first segment and a corrected version of the first text transcript, and operate in a second speech recognition mode to convert the second speech segment into a second text transcript using the speaker-specific acoustic model and the speaker-specific language model.

In another aspect of the present invention an ASR-aided transcription method with segmented feedback training is provided, the method including a) extracting a first segment and a second segment from an audio input of speech uttered by a speaker, b) converting the first speech segment into a first text transcript using a speaker-independent acoustic model and a speaker-independent language model, c) creating a speaker-specific acoustic model and a speaker-specific language model by adapting the speaker-independent acoustic model and the speaker-independent language model using either of the first segment and a corrected version of the first text transcript, and d) converting the second speech segment into a second text transcript using the speaker-specific acoustic model and the speaker-specific language model.

In another aspect of the present invention a computer program is provided embodied on a computer-readable medium, the computer program including a first code segment operative to extract a first segment and a second segment from an audio input of speech uttered by a speaker, a second code segment operative to convert the first speech segment into a first text transcript using a speaker-independent acoustic model and a speaker-independent language model, a third code segment operative to create a speaker-specific acoustic model and a speaker-specific language model by adapting the speaker-independent acoustic model and the speaker-independent language model using either of the first segment and a corrected version of the first text transcript, and a fourth code segment operative to convert the second speech segment into a second text transcript using the speaker-specific acoustic model and the speaker-specific language model.

BRIEF DESCRIPTION OF THE DRAWINGS

Embodiments of the present invention will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1A:
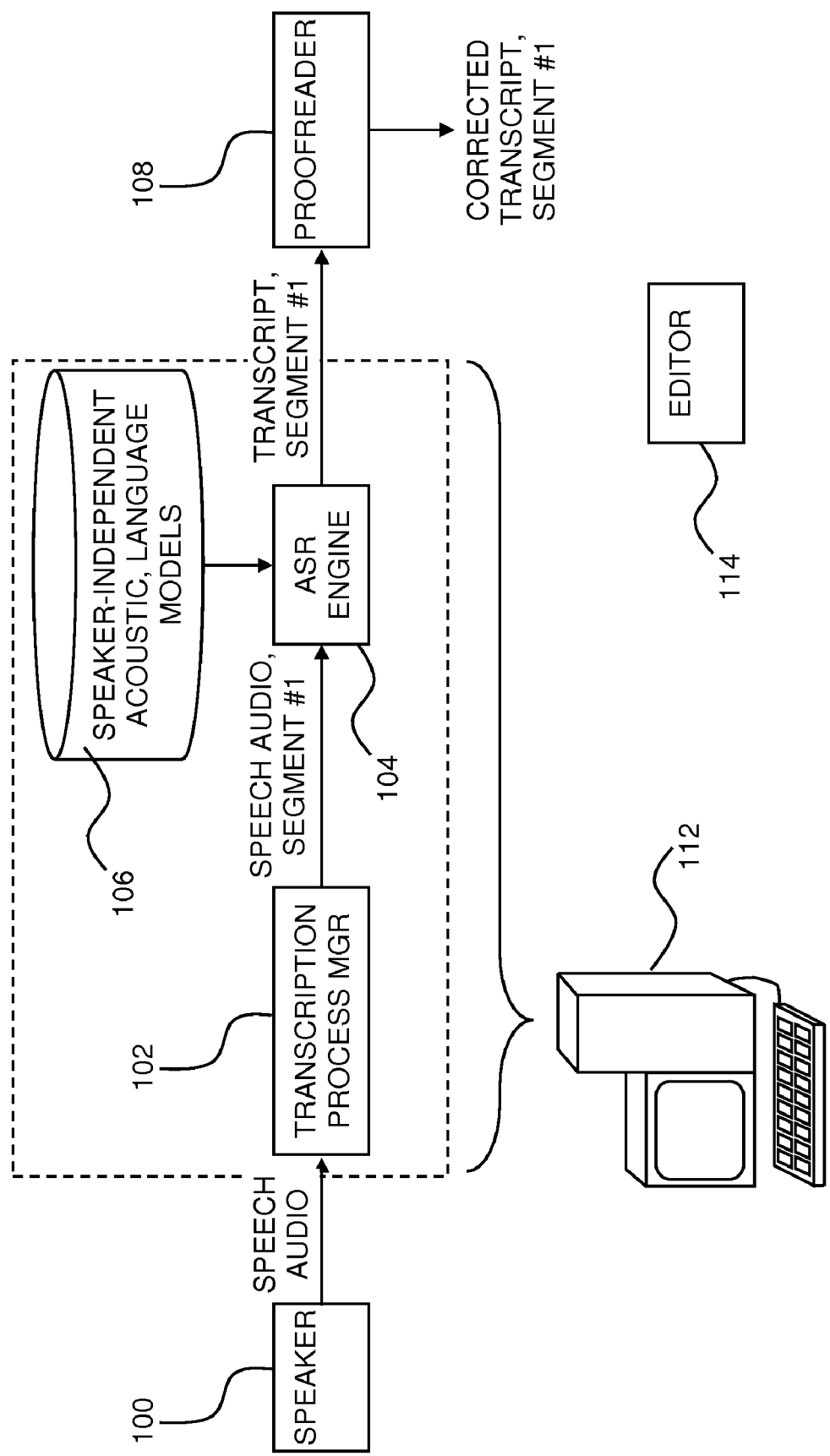
FIGS. 1A, 1B, and 1C are simplified block-flow diagrams of an ASR-Aided Transcription system with Segmented Feedback Training, constructed and operative in accordance with an embodiment of the present invention.
Figure 1B:
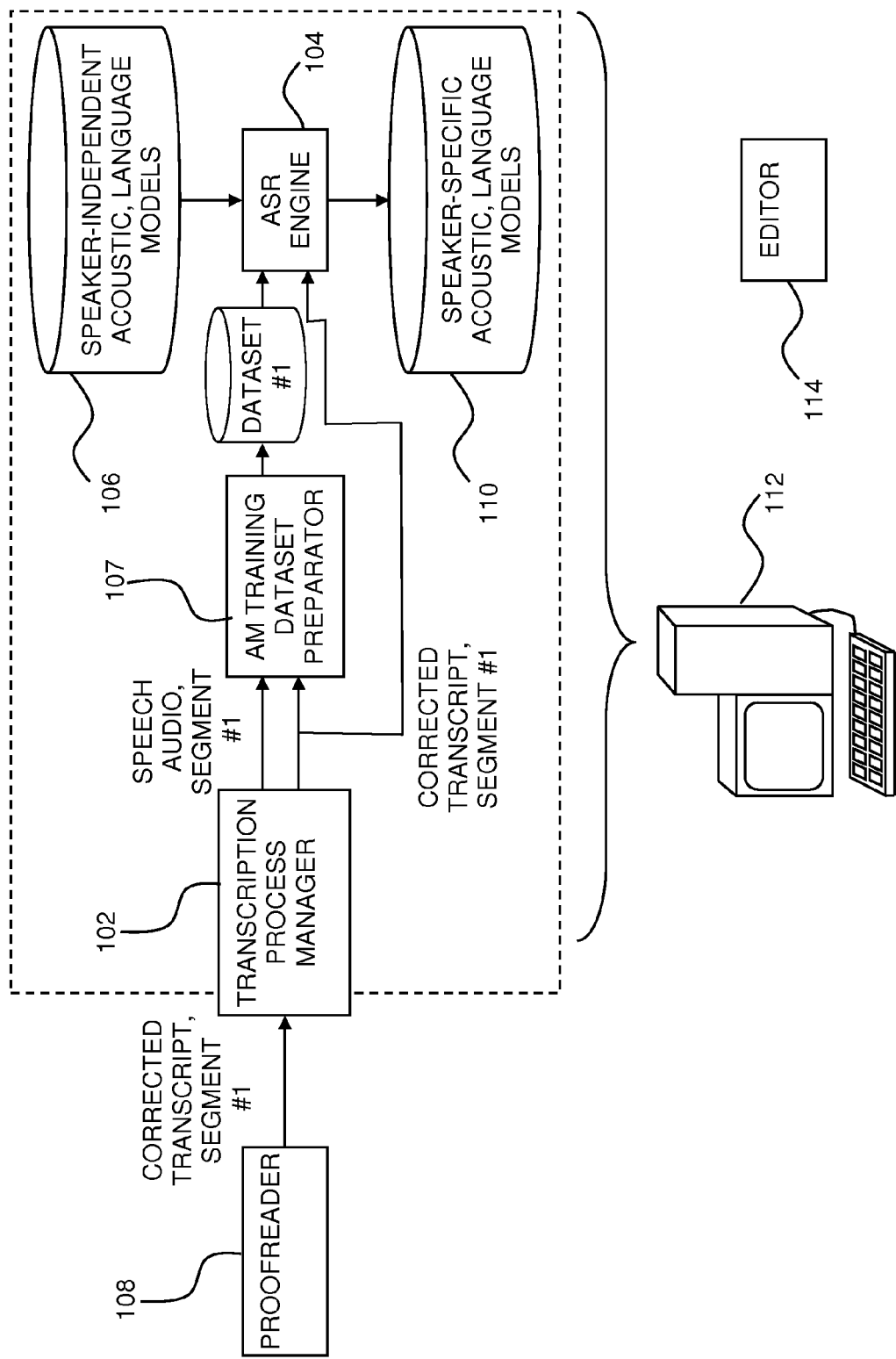
Figure 1C:
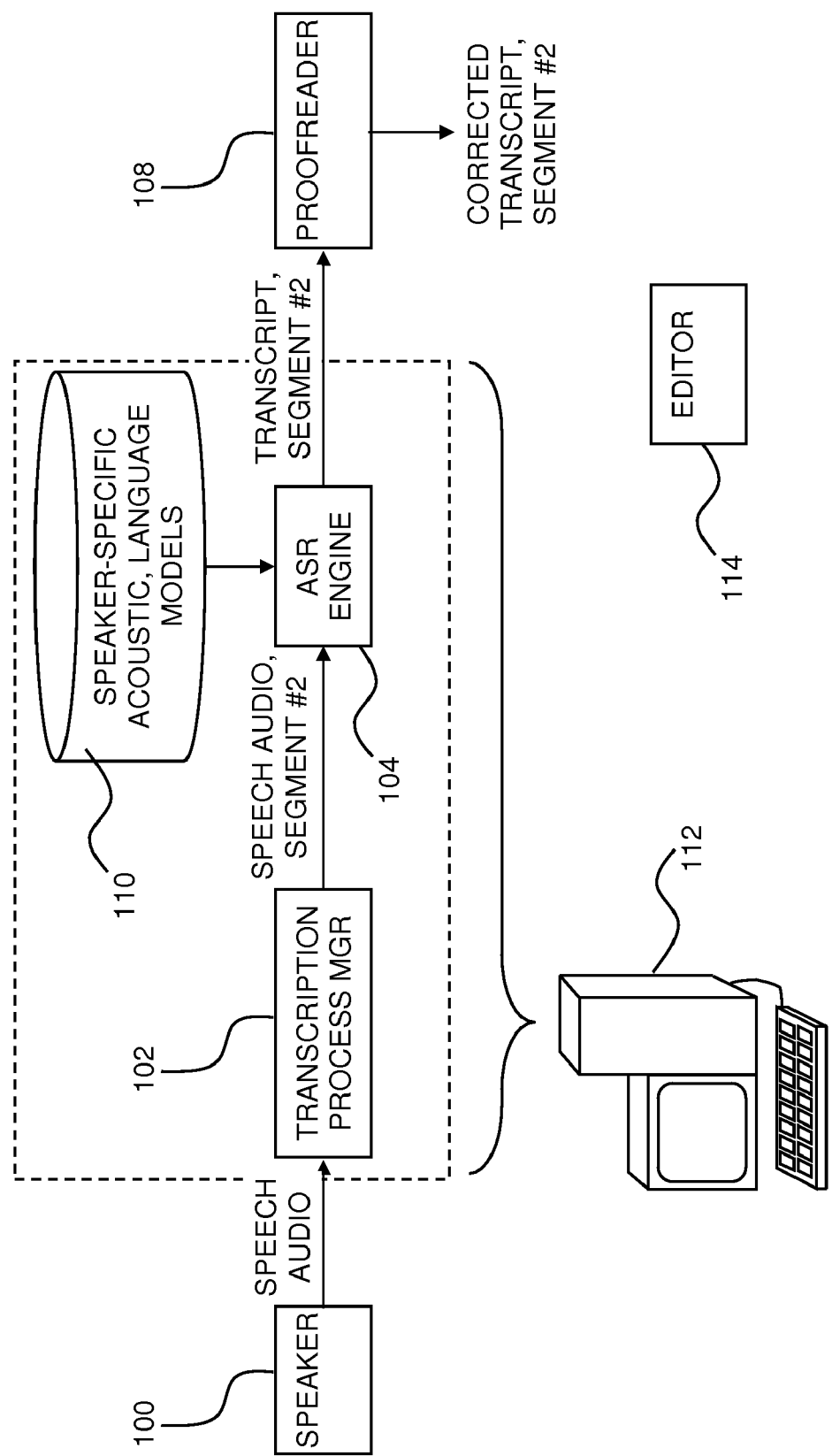
Figure 2:
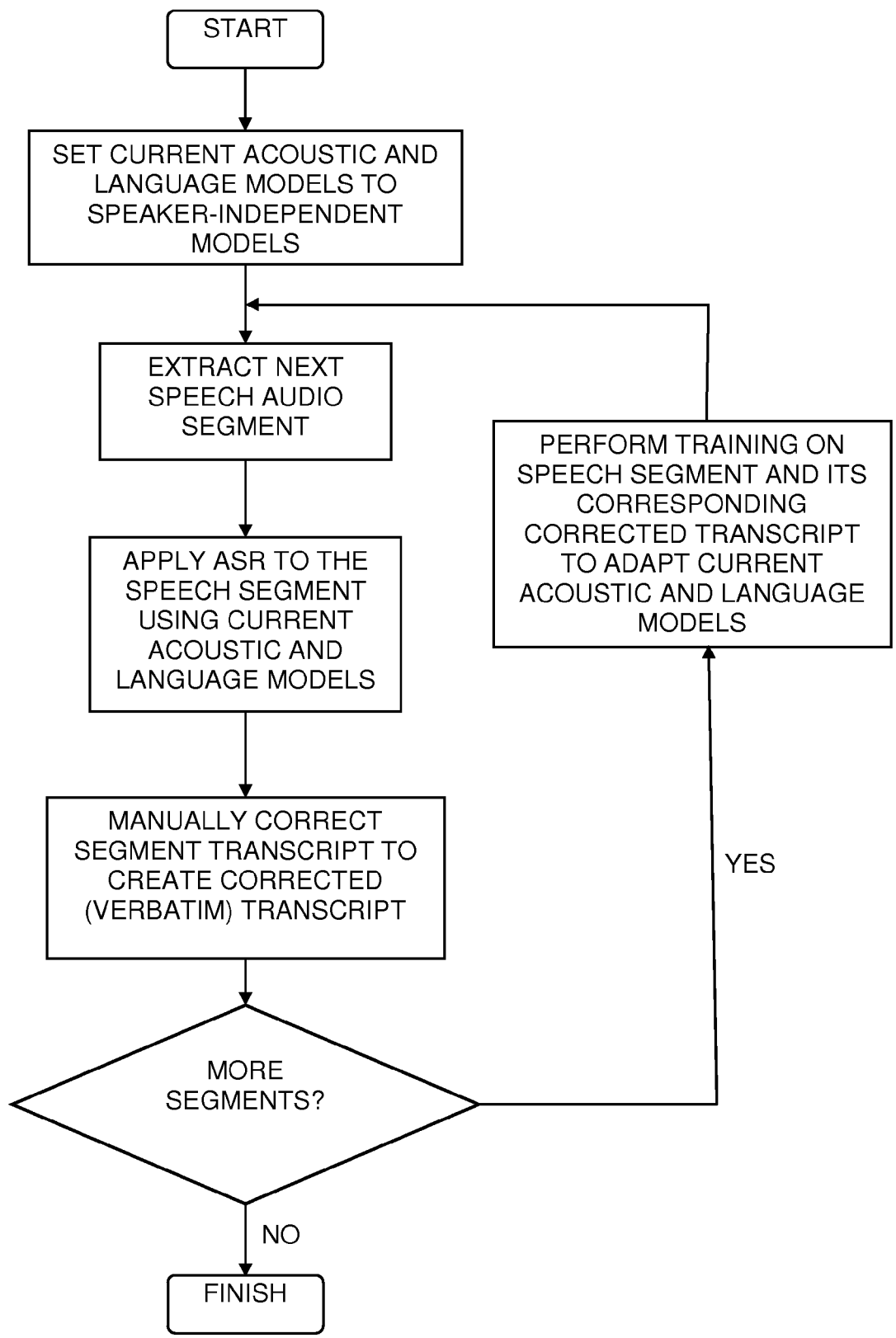
FIG. 2 is a simplified flowchart illustration of an exemplary method of operation of the system of FIGS. 1A, 1B, and 1C, operative in accordance with an embodiment of the present invention.

Reference is now made to FIGS. 1A, 1B, and 1C, which are simplified block-flow diagrams of an ASR-Aided Transcription system with Segmented Feedback Training, constructed and operative in accordance with an embodiment of the present invention, and additionally to FIG. 2, which is a simplified flowchart illustration of an exemplary method of operation of the system of FIGS. 1A, 1B, and 1C, operative in accordance with an embodiment of the present invention. Referring specifically to FIG. 1A, live or recorded audio of speech uttered by a human speaker 100 is input into a transcription process manager 102 which extracts a first segment of a predefined duration from the speech audio, typically from the beginning of the speech audio. Typically, the first segment duration is set to a several minutes in length, such as five minutes. Manager 102 then inputs the first speech segment into an ASR engine 104 which, while in a speech recognition mode, converts the speech segment into a text transcript and preferably word time offsets as well in accordance with conventional speech recognition techniques. ASR engine 104 typically employs speaker-independent acoustic and language models 106 where speaker 100 is unknown to ASR engine 104 in that ASR engine 104 has not previously been trained on speech uttered by speaker 100. The segment transcript is then provided to a human proofreader 108 who reads and corrects the segment transcript, such as by reading the transcript while listening to some or all of the speech segment. The corrected transcript preferably includes the word time offset information output by ASR engine 104.

Referring now to FIG. 1B, after the segment transcript has been corrected by proofreader 108, manager 102 instructs ASR engine 104 to enter a training mode in order to create speaker-specific acoustic and language models 110 by adapting speaker-independent acoustic and language models 106 using the speech audio segment and the corrected transcript. The speaker-specific language model is trained by ASR engine 104 in accordance with conventional techniques. The corrected transcript is typically used for language model training, whereas both the speech audio segment and the corrected transcript are used for acoustic model training. A training dataset used for training acoustic models typically includes multiple elements, where each element is a pair of audio and text pieces representing a short utterance, typically not longer than 30 seconds in length. The speech audio segment, the corrected transcript, and the word time offset information are passed to an Acoustic Model Training Dataset Preparator 107 which divides the speech audio segment and the corrected transcript into short pieces using the word time offset information. The word time offset information is used to control the piece length and the boundaries between the pieces. The piece boundaries are preferably chosen at pauses between consecutive words that are well separated from each other in order to avoid cutting off parts of the audio signal. Acoustic Model Training Dataset Preparator 107 creates a training dataset which is a collection of the speech audio pieces and the text pieces associated with them. The training dataset is then passed to ASR engine 104 which then performs acoustic model training in accordance with conventional techniques.

Once the training of ASR engine 104 using the first speech segment and its transcript has been completed, manager 102 extracts the next segment from the speech audio signal. The duration of the next segment may be either a constant predefined value or a monotonically increasing function of the recognition accuracy achieved by ASR engine 104 using the previous segment. An automatic measurement of the ASR accuracy may be performed either by a comparing the automatically generated transcript to the corrected transcript, or by counting the number of corrections made by proofreader 108. The exact positions of segment boundaries are preferably selected within silence portions of audio signal. In order to accomplish this manager 102 preferably employs any conventional Voice Activity Detection method.

After ASR engine 104 completes the current training operation it leaves its training mode and processes the next segment as shown in FIG. 1C, which it does in the same manner as it processed the first segment in FIG. 1A, with the notable exception that ASR engine 104 now employs speaker-specific acoustic and language models 110 in place of speaker-independent acoustic and language models 106. Since the speaker is now "known" to ASR engine 104 due to the acoustic and language model training performed on the first speech segment and its corrected transcript, ASR engine 104 is now capable of converting the second segment into text with greater accuracy than it could achieve using the speaker independent models.

Each subsequent segment may thus be converted into text by ASR engine 104 using the speaker-specific acoustic and language models obtained from the latest training session. This text is then proofread by proofreader 108. The resulting corrected transcript is fed back into ASR engine 104 together with its corresponding audio segment in order to further adapt the speaker-specific acoustic and language models 110 to the speaker as described above, with training performed using the latest speaker-specific acoustic and language models in place of speaker independent models used for the training performed on the first segment. Typically, the burden on proofreader 108 decreases as the process proceeds from one segment to the next, and the total number of corrections made by proofreader 108 on the entire speech input is lower than would be the case where proofreader 108 proofreads a single transcript of the entire speech prepared by prior art speaker-independent ASR systems.

The sequential corrected segmental transcripts produced by proofreader 108 are preferably assembled together to produce a single corrected transcript for the entire audio speech signal. Proofreader 108 preferably outputs a verbatim transcript in order to enhance the training effectiveness. The verbatim transcript may then be edited by an editor 114. The editing need not require listening to the audio and typically includes removal of hesitation and interjections and insertion of punctuation marks. The word time offset information may be added to the final transcript as a provision for audio captioning.

Figure 3:
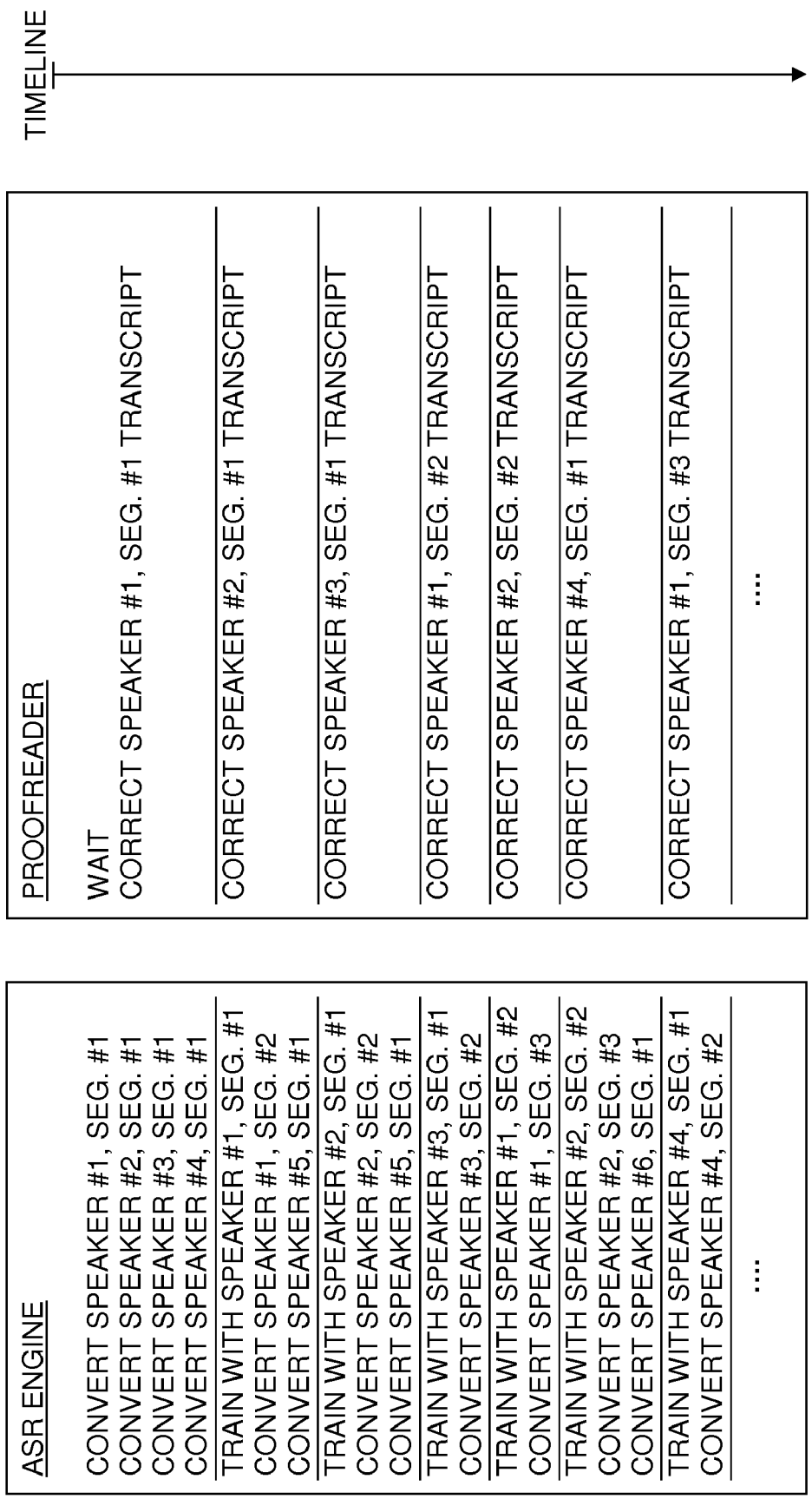
FIG. 3 is an exemplary operational scenario of an exemplary method of operation of the system of FIGS. 1A, 1B, 1C, and 2, from the perspectives of ASR engine 104 and proofreader 108, operative in accordance with an embodiment of the present invention.

Reference is now made to FIG. 3, which is an exemplary operational scenario of the invention of FIGS. 1A, 1B, 1C, and 2, from the perspectives of ASR engine 104 and proofreader 108. In the scenario of FIG. 3, speech segment transcripts from one speaker are proofread by proofreader 108 while speech segments from other speakers are processed by ASR engine 104. ASR engine 104 maintains separate acoustic and language models for each speaker and performs either training or speech-to-text conversion depending on its inputs as described above. In this manner, proofreader 108 need not be idle after proofreading a segment transcript while waiting for the next speech segment from the same speaker to be subsequently converted into text. Similarly, ASR engine 104 need not be idle after processing a speech audio segment while waiting for the corrected segment transcript required for the subsequent training session.

The present invention may be implemented using multiple instances of ASR engine 104 and multiple proofreaders 108. For example, some ASR engines instances may operate in speech recognition mode while other instances operate in training mode. Manager 102 preferably maintains a pool of speaker-specific acoustic and language models and provides an ASR engine instance with the models associated with the speech audio input that is to that ASR engine.

Any of the elements of the invention referred to herein may be stored on, executed by, and/or otherwise managed by one or more computers 112.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. An ASR-aided transcription system with segmented feedback training, the system comprising:
   a transcription process manager configured to extract a first segment and a second segment from an audio input of speech uttered by a speaker; and
   an ASR engine configured to:
      operate in a first speech recognition mode to convert said first speech segment into a first text transcript using a speaker-independent acoustic model and a speaker-independent language model;
      operate in a first training mode to create a speaker-specific acoustic model and a speaker-specific language model by:
         adapting said speaker-independent acoustic model using said first segment and/or a proofread version of said first text transcript; and
         adapting said speaker-independent language model using at least the proofread version of said first text transcript; and
      operate in a second speech recognition mode to convert said second speech segment into a second text transcript using said speaker-specific acoustic model and said speaker-specific language model.

2. A system according to claim 1 wherein said ASR engine is configured to operate in a second training mode to:
   adapt said speaker-specific acoustic model using said second speech audio segment and/or a proofread version of said second text transcript; and
   adapt said speaker-specific language model using at least said proofread version of said second text transcript.

3. A system according to claim 2 wherein said ASR engine is configured to alternately operate in said second speech recognition mode and said second training mode for processing a plurality of segments of said audio input subsequent to processing said first segment.

4. A system according to claim 2 wherein said ASR engine is configured to cyclically process multiple speech segments from multiple speakers, where said ASR engine uses a different set of said speaker-specific models for each of said speakers.

5. A system according to claim 1 wherein said ASR engine is configured when in either of said speech recognition modes to determine a plurality of word time offsets for words in either of said segments, and when in said training mode to adapt said speaker-specific models using said word time offsets.

6. A system according to claim 5 and further comprising an Acoustic Model Training Dataset Preparator operative to
   receive any of said segments, said proofread transcript, and said word time offsets,
   divide said received segment and said proofread transcript into a plurality of audio and text pieces, and
   create a training dataset of corresponding pairs of said audio and text pieces,
   wherein said ASR engine is configured to use said training dataset when in any of said training modes to adapt any of said speaker-specific acoustic models.

7. An ASR-aided transcription method with segmented feedback training, the method comprising:
   a) extracting a first segment and a second segment from an audio input of speech uttered by a speaker;
   b) converting said first speech segment into a first text transcript using a speaker-independent acoustic model and a speaker-independent language model;
   c) creating a speaker-specific acoustic model by adapting said speaker-independent acoustic model using said first segment and/or a proofread version of said first text transcript;
   d) creating a speaker-specific language model by adapting said speaker-independent language model using at least said proofread version of said first text transcript; and
   e) converting said second speech segment into a second text transcript using said speaker-specific acoustic model and said speaker-specific language model.

8. A method according to claim 7 and further comprising
   f) adapting said speaker-specific acoustic model using said second speech audio segment and/or a proofread version of said second text transcript; and
   g) adapting said speaker-specific language model using at least said proofread version of said second text transcript.

9. A method according to claim 8 and further comprising cyclically performing said e) converting, said f) adapting and said g) adapting for processing a plurality of segments of said audio input subsequent to processing said first segment.

10. A method according to claim 8 and further comprising alternatingly processing multiple speech segments from multiple speakers using separate sets of said speaker-specific models for each of said speakers.

11. A method according to claim 7 and further comprising:
    determining a plurality of word time offsets for words in either of said segments; and
    adapting said speaker-specific models using said word time offsets.

12. A method according to claim 11 and further comprising:
    dividing any of said segments and said proofread transcript corresponding to said segment into a plurality of audio and text pieces;
    creating a training dataset of corresponding pairs of said audio and text pieces; and
    adapting any of said speaker-specific acoustic models using said training dataset.

13. A computer-readable recordable device encoded with a plurality of instructions that, when executed by at least one computer, perform a method comprising:
    extracting a first segment and a second segment from an audio input of speech uttered by a speaker;
    converting said first speech segment into a first text transcript using a speaker-independent acoustic model and a speaker-independent language model;
    creating a speaker-specific acoustic model by adapting said speaker-independent acoustic model using said first segment and/or a proofread version of said first text transcript;
    creating a speaker-specific language model by adapting said speaker-independent language model using at least said proofread version of said first text transcript; and converting said second speech segment into a second text transcript using said speaker-specific acoustic model and said speaker-specific language model.

14. The computer readable recording device of claim 13, wherein the method further comprises:

adapting said speaker-specific acoustic model using at least said second speech audio segment and/or a proofread version of said second text transcript; and adapting said speaker-specific language model using at least said proofread version of said second text transcript.

15. The computer readable recording device of claim 13, wherein the method comprises cyclically processing a plurality of segments of said audio input subsequent to processing said first segment.

16. The computer readable recording device of claim 13, wherein the method further comprises:

determining a plurality of word time offsets for words in either of said segments; and adapting said speaker-specific acoustic model using said word time offsets.

17. The computer readable recording device of claim 13, wherein the method further comprises:

dividing any of said segments and said proofread transcript corresponding to said segment into a plurality of audio and text pieces;

creating a training dataset of corresponding pairs of said audio and text pieces; and adapting any of said speaker-specific acoustic models using said training dataset.

18. The computer readable recording device of claim 13, wherein the method comprises cyclically processing multiple speech segments from multiple speakers using separate sets of said speaker-specific models for each of said speakers.

* * * * *